No. 663,630. Patented Dec. 11, 1900.
G. JULIAN.
AUTOMATIC CLUTCH AND BRAKE.
(Application filed Apr. 12, 1900.)
(No Model.)
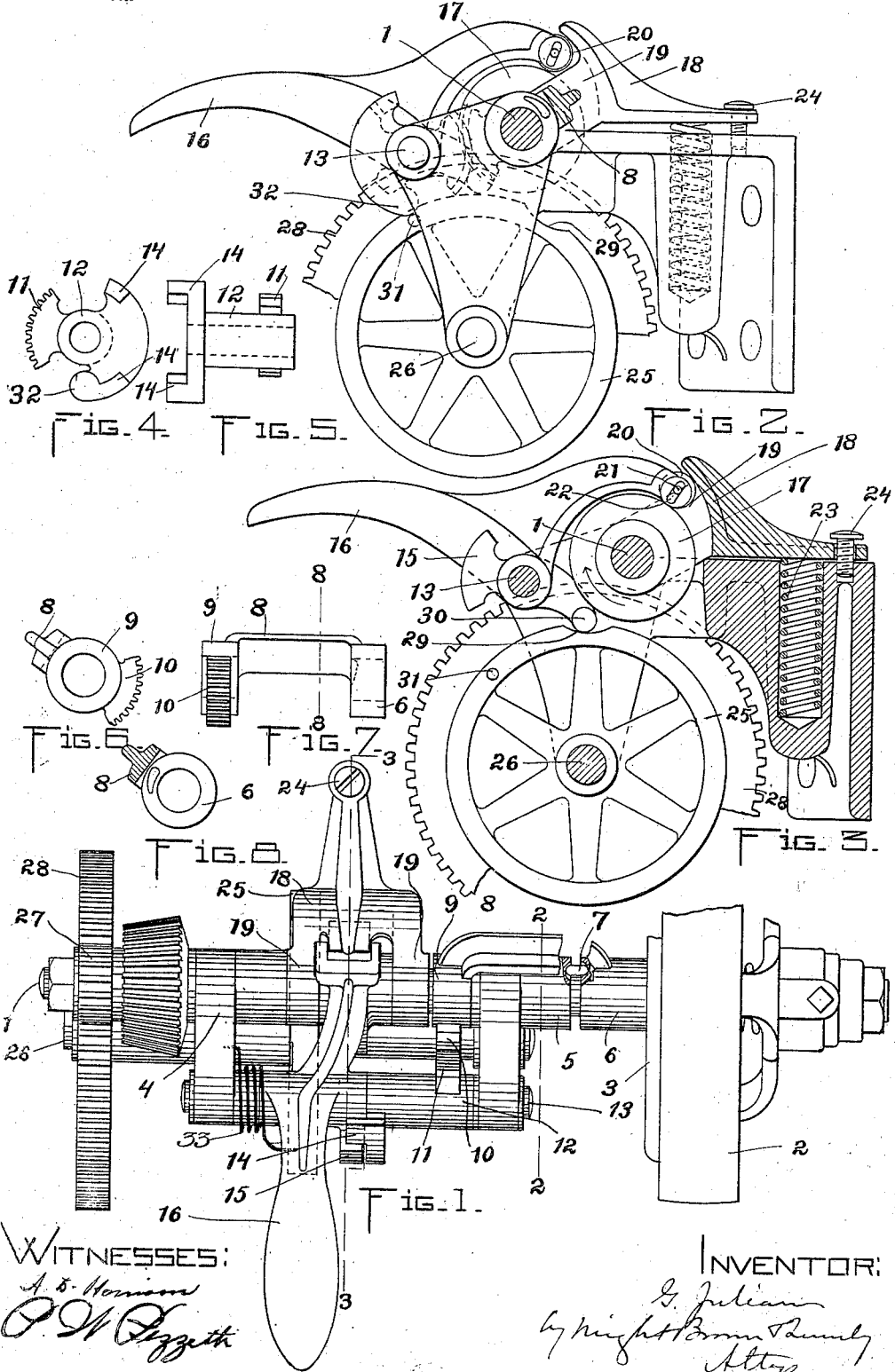
WITNESSES:
INVENTOR:

UNITED STATES PATENT OFFICE.

GIDEON JULIAN, OF BOSTON, MASSACHUSETTS, ASSIGNOR TO GEORGE H. P. FLAGG, OF SAME PLACE.

AUTOMATIC CLUTCH AND BRAKE.

SPECIFICATION forming part of Letters Patent No. 663,630, dated December 11, 1900.

Application filed April 12, 1900. Serial No. 12,526. (No model.)

*To all whom it may concern:*

Be it known that I, GIDEON JULIAN, of Boston, in the county of Suffolk and State of Massachusetts, have invented certain new and useful Improvements in Automatic Clutches and Brakes, of which the following is a specification.

This invention relates to mechanism for connecting a driving device, such as a belt-pulley, to or releasing it from the shaft to which it imparts motion and for arresting the movement of said shaft after its disconnection from the pulley.

The invention has for its objects to provide an improved form of brake for arresting the movement of the shaft and also improved devices for throwing off the clutch and setting the brake.

To these ends the invention consists in certain novel features of construction and arrangement which I shall now proceed to describe and claim.

Of the accompanying drawings, Figure 1 represents a plan view, partly in section, of a shaft-controlling mechanism constructed in accordance with my invention. Fig. 2 represents a section on line 2 2 of Fig. 1. Fig. 3 represents a section on line 3 3 of Fig. 1. Figs. 4 to 8, inclusive, represent detail views in elevation and section showing two members of the clutch-actuating mechanism.

The same reference characters indicate the same parts in all the figures.

Referring to the drawings, 1 designates a power-driven shaft having a belt-pulley 2 loosely mounted on it and provided with a clutch member and a complemental clutch member 3, splined to and movable longitudinally of the shaft into and out of engagement with the pulley clutch member.

4 5 are fixed bearings for the shaft 1, and 6 is a collar loosely mounted on the shaft and adapted by longitudinal movement to force the clutch member 3 into engagement with the clutch member on the pulley 2, so as to cause the member 3 and the shaft to be rotated without the collar itself being rotated by the member 3. Longitudinal movement of the collar 6 is produced by imparting to it a partial rotation, this rotation acting to move a strut 7, which is interposed between bearing 5 and the collar 6 and is held by notches in said parts either into a diagonal position or into a longitudinal position. The collar 6 is connected by a yoke 8 with a second collar 9, loosely mounted on the shaft 1 and having a gear-segment 10, which meshes with a second gear-segment 11 on a sleeve 12, which is loosely supported by a fixed pintle 13. Also formed on sleeve 12 are two abutments 14 14, separated by a space in which operates a lug 15, formed on the hub of a hand-lever 16, which is supported by pintle 13.

17 is a brake-drum formed on or attached to the shaft 1, and 18 is an opposed braking member or shoe having two side arms 19 19, which loosely surround the shaft 1. The inner surface of said braking member forms a contracted throat with the periphery of drum 19, as shown in Fig. 3, and in said throat operates a roller-wedge 20, carried by the inner end of operating-lever 16. To compensate for the different arcs of movement of lever 16 and roll 20, the trunnions 21 of said roll are journaled in transverse slots 22 in the lever 16, so as to permit a bodily transverse movement of the roll with respect to the lever. The rotation of the shaft 1 being in the direction of the arrow in Fig. 3, if the wedging-roll 20 be forced into the contracted throat between brake-drum 17 and braking member 18 it will tend to arrest the rotation of said brake-drum and the shaft 1. The braking member 18 is also permitted to have a limited rotary movement with the drum 17 when the braking action takes place, which movement is resisted by a spring 23. The reverse movement of the member 18 is limited by an adjustable check-stud 24, mounted in the machine-frame. By means of a spring 33 the inner end of lever 16 tends to become depressed, so as to move the wedging-roll 20 into the contracted throat between drum 17 and member 18. To prevent this movement of the lever except at a predetermined time, I provide a cam-wheel 25, secured to a counter-shaft 26, which is rotated by a pinion 27 and gear 28 upon the shaft 1 and having a notch 29 at a point in its periphery, the remaining portion of said periphery being concentric with the wheel-axis.

30 is a dog formed on the hub of operating-lever 16 and pressing continually against the periphery of cam-wheel 25. When said dog is in contact with the concentric portion of the cam-wheel, the lever 16 is held in such position as to retract the roll 20 from the contracted throat between drum 17 and member 18. When, however, the dog 30 is in the notch 29, the operating-lever oscillates, so as to move the wedging-roll into the said throat and set the brake. The cam-wheel 25 is also provided at a point on its rim with a laterally-projecting pin or tripper 31, adapted to come in contact with an abutment 32 on sleeve 12, whereby said sleeve is oscillated and the clutch members released, the arrangement being, preferably, such that pin 31 will operate on abument 32 before notch 29 operates on dog 30. Sufficient free play is allowed between lug 15 and abutments 14 14 to permit the clutch to be thrown off without setting the brake.

When the shaft 1 is to be set in motion, the outer end of hand-lever 16 is depressed. This movement will first throw off the brake and will then set the clutch through the co-action of lug 15 and the lower one of the two abutments 14, so as to connect the shaft 1 with the driving-pulley 2. The rotation of the shaft continues until pin 31 reaches abutment 32, when the clutch is automatically released. The momentum of the parts with which the shaft is connected will supposedly be sufficient to continue the rotation of said shaft until notch 29 reaches dog 30, whereupon the brake will be automatically set and the rotation of the shaft arrested. The relation of the gears 27 28 may be such that the shaft 1 completes a definite number of rotations to one rotation of the cam-wheel 25. The braking movement occurs gradually and without shock. The spring 23 serves to prevent any violent shock or jar and also acts by its recoil to give the shaft a partial backward rotation after the arrest of its forward rotation, a result that is useful when my invention is used in a sole-rounding machine, in which the shaft 1 is geared to mechanism that impels a sole-trimming knife around the edge of a sole, the said backward rotation moving the knife backward a short distance from the point where it was stopped by the arrest of the forward rotation of the shaft. The knife is thereby enabled to pass by the point where it normally stops in order that there may be no liability of leaving a portion of the sole untrimmed at or about the end of the stroke.

I claim—

1. The combination of a brake-drum and means to rotate the same, an opposed braking member forming a contracted throat with the periphery of said drum, a wedging member operating in said throat and adapted to arrest the rotation of the drum when forced between said drum and the opposed braking member, said wedging member being normally retracted from the throat, and a device controlled by the drum-rotating means and arranged to project said wedging member into the throat upon a predetermined rotary movement of the drum.

2. The combination of a brake-drum and means to rotate the same, an opposed braking member forming a contracted throat with the periphery of said drum, a roll operating as a wedge in said throat and adapted to arrest the rotation of the drum when forced between said drum and the opposed braking member, and an operating-lever pivoted eccentrically of the drum and journaling said roll, together with provisions for a bodily movement of the roll transversely of the lever.

3. The combination of a brake-drum and means to rotate the same, an opposed braking member forming a contracted throat with the periphery of said drum, a wedging member operating in said throat and adapted to arrest the rotation of the drum when forced between said drum and the opposed braking member, a dog connected with the wedging member and movable to project the same into the throat or to retract it therefrom, and a cam rotated by the drum-rotating means and controlling said dog.

4. The combination of a brake-drum and means to rotate the same, an opposed braking member forming a contracted throat with the periphery of said drum and mounted for a limited rotary movement with the drum, a wedging member operating in said throat and adapted to arrest the rotation of the drum when forced between said drum and the opposed braking member and to impart a rotary movement to said braking member when so forced, and a spring yieldingly opposing the said rotary movement of the braking member.

5. The combination of a rotary shaft, means to drive the same, a clutch adapted to connect said shaft with and disconnect it from the driving means, a brake adapted to arrest the rotation of the shaft, a member movable to set the brake, a device independently movable to throw off the clutch, and means rotated by the shaft and arranged to separately actuate said device and said member.

6. The combination of a rotary shaft, means to drive the same, a clutch adapted to connect said shaft with and disconnect it from the driving means, a brake adapted to arrest the rotation of the shaft, an operating-lever movable to throw the brake into and out of action, a device actuated by said lever to throw the clutch on and off, said device having a clutch-releasing movement independent of the lever, and means rotated by the shaft and arranged to separately actuate said lever and said device to throw off the clutch and set the brake.

7. The combination of a rotary shaft, means to drive the same, a clutch adapted to connect said shaft with and disconnect it from the driving means, a brake adapted to arrest the rotation of the shaft, an operating-lever movable to throw the brake into and out of action, a device actuated by said lever to throw the clutch on and off, said device having a clutch-releasing movement independent of the lever, and a counter-shaft rotated from the first said shaft and having a trip adapted to actuate said device to throw off the clutch and a cam adapted to independently actuate said lever to set the brake.

8. The combination of a rotary shaft, means to drive the same, a clutch adapted to connect said shaft with and disconnect it from the driving means, a brake-drum connected with the shaft, an opposed braking member forming a contracted throat with the periphery of the drum, and an operating-lever controlling the clutch and having a wedging member movable into and out of said throat and adapted to arrest the rotation of the drum and shaft when forced between said drum and the opposed braking member.

9. The combination of a rotary shaft, means to drive the same, a clutch adapted to connect said shaft with and disconnect it from the driving means, a brake-drum connected with the shaft, an opposed braking member forming a contracted throat with the periphery of the drum, an operating-lever controlling the clutch and having a wedging member movable into and out of said throat and adapted to arrest the rotation of the drum and shaft when forced between said drum and the opposed braking member, said lever having a dog, and a cam rotated by the shaft and coacting with said dog to oscillate the lever and move the wedging member into and out of the throat.

In testimony whereof I have affixed my signature in presence of two witnesses.

GIDEON JULIAN.

Witnesses:
G. W. MALEY,
C. F. BROWN.